(12) United States Patent
Koizumi

(10) Patent No.: US 7,063,823 B2
(45) Date of Patent: Jun. 20, 2006

(54) DEPLETED $UF_6$ PROCESSING PLANT AND METHOD FOR PROCESSING DEPLETED $UF_6$

(75) Inventor: Hiromichi Koizumi, Mito (JP)

(73) Assignee: Mitsubishi Materials Corporation, Tokyo (JP)

( * ) Notice: Subject to any disclaimer, the term of this patent is extended or adjusted under 35 U.S.C. 154(b) by 560 days.

(21) Appl. No.: 10/198,358

(22) Filed: Jul. 19, 2002

(65) Prior Publication Data

US 2002/0192124 A1    Dec. 19, 2002

Related U.S. Application Data

(62) Division of application No. 09/494,346, filed on Jan. 31, 2000, now Pat. No. 6,451,274.

(30) Foreign Application Priority Data

Jun. 16, 1999    (JP)    ................................ 11-169443

(51) Int. Cl.
*C01G 56/00*    (2006.01)
*B01J 8/18*    (2006.01)

(52) U.S. Cl. .......................... 423/3; 423/260; 423/261; 423/483; 423/490; 422/139; 422/142; 422/159

(58) Field of Classification Search .................... 423/3, 423/260, 261, 490, 483; 422/139, 142, 159
See application file for complete search history.

(56) References Cited

U.S. PATENT DOCUMENTS

| | | | | |
|---|---|---|---|---|
| 3,743,704 A | * | 7/1973 | West | ........................... 423/490 |
| 4,830,841 A | * | 5/1989 | Urza | ........................... 423/261 |
| 5,382,423 A | * | 1/1995 | Ohmi et al. | ................. 422/198 |

* cited by examiner

*Primary Examiner*—Steven Bos
(74) *Attorney, Agent, or Firm*—Oblon, Spivak, McClelland, Maier & Neustadt, P.C.

(57) ABSTRACT

A depleted $UF_6$ processing plant including a first fluidized bed reactor configured to react depleted $UF_6$ with steam to produce $UO_2F_2$ and hydrogen fluoride, a second fluidized bed reactor connected to the first fluidized bed reactor and configured to react the $UO_2F_2$ with steam to produce $U_3O_8$, hydrogen fluoride and oxygen, a gas cooler configured to cool the hydrogen fluoride generated in the first and second fluidized bed reactors down to 150 to 300° C., and a fluorine fixing reactor containing granular calcium carbonate and connected to the gas cooler to receive the hydrogen fluoride cooled down to 150 to 300° C. from the gas cooler. The fluorine fixing reactor is configured to form granular calcium fluoride from the granular calcium carbonate and the hydrogen fluoride passing through the fluorine fixing reactor.

5 Claims, 1 Drawing Sheet

DEPLETED UF$_6$ PROCESSING PLANT AND METHOD FOR PROCESSING DEPLETED UF$_6$

CROSS-REFERENCE TO RELATED APPLICATIONS

The present application claims priority to Japanese Patent Application No. 11-169443, filed Jun. 16, 1999 and is a divisional of U.S. patent application Ser. No. 09/494,346, filed Jan. 31, 2000, now U.S. Pat. No. 6,451,274. The contents of those applications are incorporated herein by reference in their entirety.

BACKGROUND OF THE INVENTION

1. Field of the Invention

The present invention relates to a depleted UF$_6$ processing plant for processing depleted UF$_6$ by converting UF$_6$ into U$_3$O$_8$, and a method for processing depleted UF$_6$.

2. Discussion of the Background

The proportion of depleted UF$_6$ accumulated in an uranium enrichment plant amount to nearly 90% of the UF$_6$ starting material, and it is mostly stored by filling in a UF$_6$ cylinder that is a cylindrical sealed storage vessel. However, since this substance is almost permanently stored, there arises a management problem of maintaining the vessel with a large quantity of depleted UF$_6$ from corrosion over an extended period of time, as well as waste of resources and economical deficiencies caused by a vast amount of fluorine resources being stored in the form of UF$_6$.

A large amount of depleted UF$_6$ containing a low concentration of U$_{235}$ is accumulated in the enrichment process of U$_{235}$ in the uranium enrichment plant when U$_{235}$ is enriched using UF$_6$ produced from natural uranium or recovered UF$_6$ as a starting material. To solve the problems described, the inventors of the present invention proposed a method for processing depleted UF$_6$ by converting depleted UF$_6$ containing a low concentration of U$_{235}$ into U$_3$O$_8$ by a dry vapor-phase reaction method (Japanese Unexamined Patent Publication No. 11-79749). In the method for processing depleted UF$_6$, anhydrous hydrogen fluoride is extracted as a by-product with concentrated sulfuric acid and anhydrous hydrogen fluoride is separated from dilute sulfuric acid by distillation; dilute sulfuric acid is further distilled and concentrated so as to separate dilute hydrofluoric acid from concentrated sulfuric acid; this concentrated sulfuric acid is recycled to the extraction and concentration step while dilute hydrofluoric acid is further distilled so as to separate it into azeotropic hydrofluoric acid and water that contains a small amount of hydrofluoric acid; and azeotropic hydrofluoric acid is mixed with dilute hydrofluoric acid in the distillation and concentration step to improve recovery of hydrogen fluoride for recycling in the nuclear facilities.

However, two distillation columns and one concentration column are required to regenerate hydrogen fluoride during the processing of depleted UF$_6$ described above in the nuclear facilities. To recycle hydrogen fluoride in the existing nuclear facilities, additional equipments for the recycling should be installed, resulting in not matching supply and demand of anhydrous hydrogen fluoride. Accordingly, it is also desirable to recover and store hydrogen fluoride generated as a by-product when depleted UF$_6$ is converted into U$_3$O$_8$ since it can be readily recycled.

The method for recovering and storing fluorine known in the art includes processes of forming calcium fluoride by a fixing reaction of fluorine to calcium, followed by storage of calcium fluoride. The inventors of the present invention proposed a method for recovering granular calcium fluoride by allowing a solution mainly containing hydrogen fluoride to contact granular calcium carbonate, and an equipment to be used for the method (Japanese Unexamined Patent Publication No. 10-330113). This equipment includes a storage tank for storing a solution containing 10 to 60% of hydrogen fluoride, a first cooler for cooling the solution stored in the storage tank to 0 to 5° C., a reaction tank for forming a solution containing granular calcium fluoride by adding granular calcium carbonate to the solution at a temperature of 0 to 5° C. fed from the storage tank, and a solid/liquid separator for separating granular calcium fluoride from the solution containing it. This method is so devised that fluorine is recovered with a high yield by forming calcium fluoride by cooling the reaction solution to 0 to 5° C. in the first cooler.

However, in the equipment in Japanese Unexamined Patent Publication No. 10-330113, the hydrogen fluoride gas generated as a by-product of the conversion of UF$_6$ to U$_3$O$_8$ is turned into an aqueous hydrogen fluoride solution containing 10 to 60% of hydrogen fluoride once, in order to recover hydrogen fluoride as a by-product. The foregoing conversion process requires installation of additional facilities. Also, in the conventional process described above, the recovery work becomes much complicated if the by-product hydrogen fluoride generated in the conversion of UF$_6$ into U$_3$O$_8$ could not be recovered. Also, there is a drawback that calcium fluoride formed in the recovery of hydrogen fluoride tends to be a fine powder.

SUMMARY OF THE INVENTION

According to one aspect of the present invention, a depleted UF$_6$ processing plant includes a first fluidized bed reactor for reacting depleted UF$_6$ with steam to produce UO$_2$F$_2$ and hydrogen fluoride, a second fluidized bed reactor connected to the first fluidized bed reactor and for reacting the UO$_2$F$_2$ with steam to produce U$_3$O$_8$, hydrogen fluoride and oxygen, a gas cooler for cooling the hydrogen fluoride generated in the first and second fluidized bed reactors down to 150 to 300° C., and a fluorine fixing reactor containing granular calcium carbonate and connected to the gas cooler to receive the hydrogen fluoride cooled down to 150 to 300° C. from the gas cooler. The fluorine fixing reactor forms granular calcium fluoride from the granular calcium carbonate and the hydrogen fluoride passing through the fluorine fixing reactor.

According to another aspect of the present invention, a fluorine fixing process for forming granular calcium fluoride includes mixing hydrogen fluoride formed in a dry vapor phase reaction step or hydrogen fluoride formed in a waste liquor disposal step by liquefying off gases discharged from the dry vapor phase reaction step, hydrofluoric acid recovery step, and a condensing step by condensers installed in the dry vapor phase reaction step, with the off gases thereof and a waste liquid, to form a mixture, and bringing the mixture to make contact with granular calcium carbonate.

According to yet another aspect of the present invention, a method for processing depleted UF$_6$ includes reacting depleted UF$_6$ with steam to produce UO$_2$F$_2$ and hydrogen fluoride in a first fluidized bed reactor, reacting the UO$_2$F$_2$ with steam to produce U$_3$O$_8$, hydrogen fluoride and oxygen in a second fluidized bed reactor connected to the first fluidized bed reactor, cooling the hydrogen fluoride generated in the first and second fluidized bed reactors down to 150 to 300° C., and contacting the hydrogen fluoride cooled down to 150 to 300° C. with granular calcium carbonate to from granular calcium fluoride.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
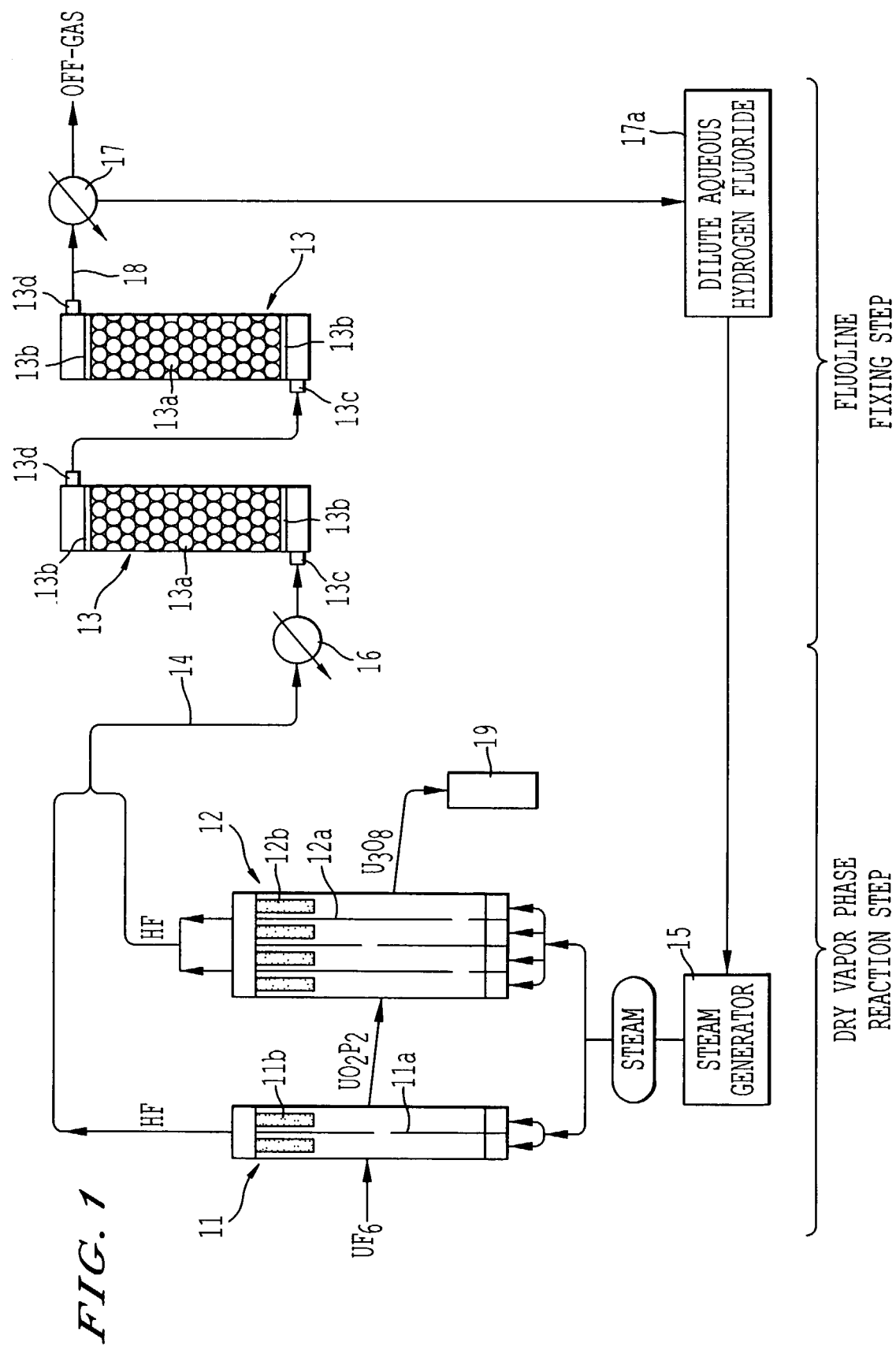
FIG. 1 is a system diagram showing a flow of a processing method and a processing plant according to an embodiment of the present invention.

The present invention will now be described in detail with reference to the drawing of the embodiment according to the present invention as shown in FIG. 1.

In FIG. 1, the depleted $UF_6$ processing plant according to one embodiment of the present invention includes: a first fluidized bed reactor 11 for forming $UO_2F_2$ and hydrogen fluoride by allowing depleted $UF_6$ to react with steam; a second fluidized bed reactor 12 for forming $U_3O_8$, hydrogen fluoride and oxygen by allowing $UO_2F_2$ to further react with steam; and a fluorine fixing reactor 13 for allowing hydrogen fluoride formed in the first and second fluidized bed reactors 11 and 12 to have contact with calcium carbonate 13a. The first and second fluidized bed reactors 11 and 12 are plate type fluidized bed reactors each having a plurality of chambers, and the installation area for the plant is reduced by using the plate type fluidized bed reactors. The plate type fluidized bed reactors in this embodiment has plural chambers divided by one or plural partition plates 11a and 12a vertically disposed in the fluidized bed. Gas/solid separation filters 11b, 12b are provided at the upper parts of the plural chambers divided by the partition plates 11a and 12a. Heaters (not shown) are provided in the first and second fluidized bed reactors 11 and 12, each heater being so constructed as to enable the reaction temperature in respective fluidized bed reactors 11 and 12 to be controlled. Steam introduced into the first and second fluidized bed reactors 11 and 12 from their bottoms is generated in a steam generator 15.

The fluorine fixing reactor 13 has plural slender cylinders filled with granular calcium carbonate 13a. A gas inlet port 13c is provided at the bottom of each cylinder, and a discharge part 13d is provided at the top of the cylinder for discharging the gas passing through the filled calcium carbonate 13a. A pair of partition plates 13b and 13b, on which a number of holes for the discharge gas to pass through but without granular calcium carbonate 13a, are provided at the top and bottom in the cylinder, and the calcium carbonate 13a is filled between this pair of the partition plates 13b and 13b. A plurality of cylinders (not shown) are disposed in a circle and exchangeable one another, and hydrogen fluoride is made to contact the calcium carbonate 13a filled in two cylinders among the plural cylinders. Actually, an inlet 13c of the first cylinder is connected to the first and second fluidized bed reactors 11 and 12 via a first piping 14, and a gas cooler 16 is provided at the first piping. A discharge port 13d of the first cylinder is connected to an inlet port 13c of the second cylinder, and a discharge port 13d of the second cylinder is connected to a condenser 17 via a second piping 18. The fluorine fixing reactor 13 is so constructed as to form granular calcium fluoride by allowing gaseous hydrogen fluoride generated in the first and second fluidized bed reactors 11 and 12 to sequentially contact the granular calcium carbonate 13a filled in the first and second cylinders. The cylinders are arranged so that additional hydrogen fluoride is fed by replacing saturated cylinders with fresh cylinders.

Calcium carbonate filled in the fluorine fixing reactor preferably has a grain size of 350 to 800 μm. When the grain size is less than 350 μm, hydrogen fluoride flow is inhibited while, when the grain size exceeds 800 μm, the total surface area of calcium carbonate diminishes, thereby reducing the amount of calcium fluoride formed.

The method for processing depleted $UF_6$ according to one embodiment of the present invention using the plant having the construction as described above will be described below.

The method for processing depleted $UF_6$ preferably includes: a dry vapor-phase reaction step for forming $UO_2F_2$ by allowing depleted $UF_6$ to react with steam at 230 to 280° C., followed by forming $U_3O_8$, hydrogen fluoride and oxygen by allowing $UO_2F_2$ to further react with steam at 600 to 700° C.; and a fluorine fixing step for forming granular calcium fluorides by allowing hydrogen fluoride generated in the dry vapor-phase reaction step to contact granular calcium carbonate at 150 to 300° C.

In the method described above, $UO_2F_2$ grains with a mean grain size of 100 to 250 μm and a bulk density of 3.5 g/cm² or more, and hydrogen fluoride are formed by allowing depleted $UF_6$ to react with steam by adjusting the reaction temperature at 230 to 280° C.; and $U_3O_8$, hydrogen fluoride and oxygen are formed by further allowing the $UO_2F_2$ grains having the properties as described above to react with steam by adjusting the reaction temperature at 600° C. or more. $U_3O_8$ thus formed has an approximately uniform mean grain size and an increased bulk density by about 10%, having good fluidity, being easy to handle and improving storage efficiency.

Dry Vapor-Phase Reaction Step

A reaction temperature in the first fluidized bed reactor 11 for allowing depleted $UF_6$ to react with steam is controlled to 230 to 280° C. with a heater (not shown), while a reaction temperature in the second fluidized bed reactor 12 for allowing $UO_2F_2$ to further react with steam is controlled to 600 to 700° C. $UO_2F_2$ granules with a mean grain size of 100 to 250 μm and a bulk density of 3.5 g/cm³, and hydrogen fluoride are formed by allowing depleted $UF_6$ to react with steam in the first fluidized bed reactor 11 controlled to 230 to 280° C. When the reaction temperature in the first fluidized bed reactor 11 is less than 230° C., physical properties of the granules may be deteriorated, while the reaction temperature exceeding 280° C. is not desirable since the bulk density is decreased. Accordingly, a preferable reaction temperature in the first fluidized bed reactor 11 is 180 to 260° C.

$U_3O_8$, hydrogen fluoride and oxygen are formed by allowing the $UO_2F_2$ granules having the properties as described above to further react with steam in the second fluidized bed reactor 12 controlled to 600 to 700° C. The recovered $U_3O_8$ powder is accommodated in a storage vessel 19 for storage of an extended period of time. $U_3O_8$ granules having a mean grain size of 100 to 250 μm have good fluidity and are easy to handle, and have a bulk density of 3.5 g/cm³, improving storage efficiency. Such $U_3O_8$ granules can be obtained by processing $UF_6$ as described above. A reaction temperature of the second fluidized bed reactor 11 of less than 600° C. is not desirable since the reaction ratio may decrease while the equipments may be corroded at a temperature over 700° C. Accordingly, a preferable temperature is from 600 through 650° C.

Fluorine Fixing Process

Hydrogen fluoride as by-products of the first fluidized bed reactor 11 and second fluidized bed reactor 12 is introduced into the fluorine fixing reactor 13 via the first piping 14. A temperature of hydrogen fluoride passing through the first piping is controlled to 150 to 300° C. with the gas cooler 16. The hydrogen fluoride controlled to 150 to 300° C. flows from the gas inlet 13c of the first and second cylinders into the bottom partition plate 13b and advances through calcium carbonate granules. Calcium fluoride is formed by allowing the hydrogen fluoride to react with the calcium carbonate granules 13a, thereby trapping the hydrogen fluoride. A part of the hydrogen fluoride may be condensed when the reaction temperature is less than 150° C., while a temperature of over 300° C. is not desirable since a grain size of resultant calcium fluoride becomes too fine. Accordingly, a preferable reaction temperature for hydrogen fluoride is from 200 through 250° C. The gas after trapping hydrogen fluoride is discharged from the discharge port 13d by passing through the upper partition plates 13b in the second cylinder.

The gas discharged from the discharge port 13d is transferred to the condenser 17 through the second piping 18. A dilute aqueous hydrogen fluoride solution liquefied and recovered in the condenser 17 is temporarily received in a storage vessel 17a for utilizing it thereafter. Since the content of fluorine fractions in the aqueous hydrogen fluoride solution received in the storage vessel 17a is so small that corrosion of the steam generator 15 is negligible except small influence on the reaction characteristics in the first and second fluidized bed reactors 11 and 12. Therefore, the aqueous hydrogen fluoride solution can be used for generating steam for the dry vapor-phase reaction process after being transferred to the steam generator 15.

EXAMPLES

Example 1

Hydrogen fluoride was processed in the fluorine fixing reactor 13. 10 kg each of calcium carbonate granules 13a with a grain size of 350 μm were filled into the first and second cylinders. After adjusting the temperature of the hydrogen fluoride at 200° C. with the gas cooler, fluorine was fixed by feeding the gas at a feed rate of 2000 litters/hour. A hydrogen fluoride gas discharged from the second cylinder was recovered in the condenser 17 at a recovery rate of 2.5 litters/hour as a dilute aqueous hydrogen fluoride solution, and the concentration of fluorine in the solution was measured to be 800 ppm. Feed of the hydrogen fluoride was stopped after 30 minutes, and calcium fluoride formed by conversion of calcium carbonate was recovered.

Comparative Example 1

Hydrogen fluoride was processed by the equipment disclosed in Japanese Unexamined Patent Publication No. 10-330113 described in the related art. 1.3 kg of calcium carbonate granules were added to 1 litter of an aqueous solution containing 50% of hydrogen fluoride while adjusting the temperature at 30° C. After a solution containing calcium fluoride granules had been formed, calcium fluoride was recovered by solid/liquid separation.

Evaluation

The purity of the recovered calcium fluoride, the conversion ratios and purity of the hydrogen fluoride, the concentrations of the aqueous hydrogen fluoride solution condensed in the condenser, and the purity of the calcium fluoride granules were determined with respect to Example 1 and Comparative Example 1. The results are shown in TABLE 1.

TABLE 1

|  | EXAMPLE 1 | COMPARATIVE EXAPLE 1 |
|---|---|---|
| PURITY OF CALCIUM FLUORIDE | 97% OR MORE | 97% OR MORE |
| CONVERSION RATIO OF FLUORINE | 99% OR MORE | 90% OR MORE |
| CONCENTRATION OF AQUEOUS HYDROGEN FLUORIDE AFTER THE REACTION | 800 PPM | 5% BY WEIGHT |
| PROPORTION OF CALCIUM FLUORIDE GRANULES HAVING A PARTICLE SIZE OF 100 μm OR LESS | LESS THAN 5% | LESS THAN 15% |

Table 1 clearly shows that, although relatively high purity calcium fluoride is obtained in both Example 1 and Comparative Example 1, fluorine is converted into calcium fluoride with a higher conversion ratio in Example 1 than in Comparative example 1, because hydrogen fluoride is directly introduced into the fluorine fixing reactor in a gaseous state.

Since the concentration of the aqueous hydrogen fluoride solution in Example 1 after the reaction is 800 ppm, corrosion of the steam generator is negligible even when the dilute aqueous hydrogen fluoride solution is used as a steam source in the dry vapor-phase reaction process, leaving no influence on the reaction characteristics of the first and second fluidized bed reactors 11 and 12.

Moreover, while the proportion of the calcium fluoride particles having a grain size of 100 μm or less formed after forming the fine powders was less than 15% in Comparative example 1, the corresponding proportion in Example 1 was less than 5%. Therefore, formation of a fine powder is more suppressed in Example 1 than in Comparative Example 1.

One aspect of the present invention is to provide a fluorine fixing reactor for forming granular calcium fluoride by allowing hydrogen fluoride cooled with a gas cooler to make contact with granular calcium carbonate, thereby enabling granular calcium fluoride to be formed by allowing gaseous hydrogen fluoride to contact calcium carbonate after directly introducing gaseous hydrogen fluoride into the fluorine fixing reactor. Therefore, needs for the equipments required in the conventional process such as a distillation column and concentration column, or a converter for converting gaseous hydrogen fluoride into an aqueous solution of hydrogen fluoride and a storage tank for storing the solution, are eliminated, making it possible to simplify a depleted $UF_6$ processing plant.

Another aspect of the present invention is to provide a gas cooler for cooling hydrogen fluoride generated in the first and second fluidized bed reactors at a temperature of 150 to 300° C., thus enabling the hydrogen fluoride generated in the first and second fluidized bed reactors to be directly introduced into the fluorine fixing reactor. Accordingly, a depleted $UF_6$ processing is simplified and calcium fluoride particles is prevented from collapsing by allowing the hydrogen fluoride to contact the calcium carbonate at a temperature of 150 to 300° C. Consequently, the granular shapes of the calcium fluoride are maintained, making handling of the calcium fluoride for fixing fluorine easy in the following processing steps.

Efflux of the secondary waste water is reduced by using the dilute aqueous hydrogen fluoride solution generated in the fluorine fixing step for steam in the dry vapor-phase reaction step, thereby reducing the processing plant size and enabling depleted $UF_6$ to be inexpensively processed.

Obviously, numerous modifications and variations of the present invention are possible in light of the above teachings. It is therefore to be understood that within the scope of the appended claims, the invention may be practiced otherwise than as specifically described herein.

The invention claimed is:

1. A depleted $UF_6$ processing plant comprising:
   a first fluidized bed reactor configured to react depleted $UF_6$ with steam to produce $UO_2F_2$ and hydrogen fluoride;
   a second fluidized bed reactor connected to the first fluidized bed reactor and configured to react the $UO_2F_2$ with steam to produce $U_3O_8$, hydrogen fluoride and oxygen;
   a gas cooler configured to cool the hydrogen fluoride generated in the first and second fluidized bed reactors down to 150 to 300° C.; and
   a fluorine fixing reactor containing granular calcium carbonate and connected to the gas cooler to receive the hydrogen fluoride cooled down to 150 to 300° C. from the gas cooler, the fluorine fixing reactor configured to form granular calcium fluoride from the granular calcium carbonate and the hydrogen fluoride passing through the fluorine fixing reactor.

2. A depleted $UF_6$ processing plant according to claim 1, further comprising recovering means for recovering the hydrofluoric acid generated in the first and second fluidized bed reactors, wherein anhydrous hydrogen fluoride produced as a by-product is extracted with sulfuric acid and separated from the sulfuric acid by distillation, the sulfuric acid is further distilled and concentrated to separate dilute hydrofluoric acid from the sulfuric acid, the sulfuric acid thus concentrated is recycled for extraction and the distillation, the dilute hydrofluoric acid is distilled to separate into azeotropic hydrofluoric acid and water containing a trace amount of hydrofluoric acid, the azeotropic hydrofluoric acid is fed back to the anhydrous hydrogen fluoride, and the water containing a trace amount of hydrofluoric acid is reacted with granular calcium carbonate to form granular calcium fluoride.

3. A depleted $UF_6$ processing plant according to claim 1, wherein the depleted $UF_6$ processing plant comprises a dilute hydrofluoric acid discharge processing plant.

4. A method for processing depleted $UF_6$, comprising:
   reacting depleted $UF_6$ with steam to produce $UO_2F_2$ and hydrogen fluoride in a first fluidized bed reactor;
   reacting the $UO_2F_2$ with steam to produce $U_3O_8$, hydrogen fluoride and oxygen in a second fluidized bed reactor connected to the first fluidized bed reactor;
   cooling the hydrogen fluoride generated in the first and second fluidized bed reactors down to 150 to 300° C.; and
   contacting the hydrogen fluoride cooled down to 150 to 300° C. with granular calcium carbonate to form granular calcium fluoride.

5. A method for processing depleted $UF_6$ according to claim 4, further comprising:
   extracting anhydrous hydrogen fluoride produced as a by-product during a dry vapor-phase reaction of depleted $UF_6$ with sulfuric acid;
   distilling the hydrogen fluoride with the sulfuric acid;
   further distilling and concentrating the sulfuric acid to separate dilute hydrofluoric acid from the sulfuric acid;
   recycling the sulfuric acid thus concentrated for extraction and the distillation;
   distilling the dilute hydrofluoric acid to separate into azeotropic hydrofluoric acid and water containing a trace amount of hydrofluoric acid;
   feeding the azeotropic hydrofluoric acid back to the extracting step to produce the anhydrous hydrogen fluoride; and
   bringing the water containing a trace amount of hydrofluoric acid to react with granular calcium carbonate to form granular calcium fluoride.

* * * * *